[12] United States Patent
Wang et al.

(10) Patent No.: US 9,781,182 B2
(45) Date of Patent: Oct. 3, 2017

(54) MONITORING OF IP MULTICAST STREAMS WITHIN AN INTERNET GATEWAY DEVICE

(71) Applicant: Alcatel-Lucent USA Inc., Murray Hill, NJ (US)

(72) Inventors: Shengqiang Wang, Cary, NC (US); Yigang Cai, Naperville, IL (US); Yijun Xu, Raleigh, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 65 days.

(21) Appl. No.: 14/748,047

(22) Filed: Jun. 23, 2015

(65) Prior Publication Data

US 2016/0380919 A1  Dec. 29, 2016

(51) Int. Cl.
*H04L 29/06* (2006.01)
*H04L 12/931* (2013.01)

(52) U.S. Cl.
CPC ........ *H04L 65/4076* (2013.01); *H04L 49/201* (2013.01)

(58) Field of Classification Search
None
See application file for complete search history.

(56) References Cited

U.S. PATENT DOCUMENTS

| 2002/0067730 A1* | 6/2002 | Hinderks | G06Q 30/02 370/395.52 |
| 2009/0064248 A1* | 3/2009 | Kwan | H04L 12/1868 725/109 |
| 2010/0046634 A1* | 2/2010 | Dai | H04N 21/23418 375/240.25 |

OTHER PUBLICATIONS

Cable Data Services, DOCSIS Provisioning of EPON Specifications, DPoE OAM Extension Specification, DPoE-SP- AMv2.0-105-140327, Mar. 27, 2014, Cable Television Laboratories, Inc. 2011-2014.*
Broadband Forum Technical Report, TR-098, Internet Gateway Device Data Model for TR-069, Issue: 1 Amendment 2, Issue Date: Sep. 2008.*
IGMP Proxy, Random technical bits and thoughts, Srini, Saturday, Feb. 23, 2008, http://netsecinfo.blogspot.com/2008/02/igmp-proxy.html.*
Broadband Forum Technical Report, Internet Gateway Device Data Model for TR-069, Issue: 1.1, Issue Date: Nov. 2006.
Cable Data Services, DOCSIS Provisioning of EPON Specifications, DPoE MAC and Upper Layer Protocols Interface Specification, DPoE-SP-MULPIv2.0I05-140327, Mar. 27, 2014, Cable Television Laboratories, 2011-2014.
Technical Report, DSL Forum, CPE WAN Management Protocol, May 2004, Produced by: DSLHome-Technical Working Group.

(Continued)

*Primary Examiner* — Charles C Jiang
*Assistant Examiner* — Saad Khawar
(74) *Attorney, Agent, or Firm* — Duft Bornsen & Fettig, LLP

(57) ABSTRACT

Apparatus and methods for reporting stream loss in internet gateway devices. One embodiment comprises an internet gateway device for installation at a customer premises. The internet gateway device identifies a request to join an IP multicast stream identified by a group address, and monitors for packets directed to the group address. The internet gateway device detects a stream loss responsive to a failure to receive a packet directed to the group address during a time interval, and reports the stream loss for the group address to a management system.

18 Claims, 8 Drawing Sheets

(56) References Cited

OTHER PUBLICATIONS

W. Fenner, Internet Group Management Protocol, Version 2, Xerox PARC, The Internet Society, Nov. 1997.
Cable Data Services, DOCSIS Provisioning of EPON Specifications, DPoE OAM Extension Specification, DPoE-SP-OAMv2.0-105-140327, Mar. 27, 2014, Cable Television Laboratories, Inc. 2011-2014.
Series G: Transmission Systems and Media, Digital Systems and Networks, Digital sections and digital line system—Optical line systems for local and access networks, Gigabit-capable Passive Optical Networks (G-PON): ONT management and control interface specification, ITU-T, G984.4, Feb. 2008.

* cited by examiner

MONITORING OF IP MULTICAST STREAMS WITHIN AN INTERNET GATEWAY DEVICE

FIELD OF THE INVENTION

The invention is related to the field of communication systems and, in particular, to IP multicast delivery.

BACKGROUND

Internet Protocol (IP) multicast refers to the sending of packets to a group of receivers. An IP multicast group address is established, and senders and receivers use the group address to send and receive an IP multicast stream of packets. A source uses the group address as the IP destination address in the packets. Receivers use the group address to inform the network that they want to receive packets sent to that group address. The protocol typically used by receivers to join a group is referred to as the Internet Group Management Protocol (IGMP).

IP multicasting may be used to deliver Internet Protocol Television (IPTV) content. IPTV is a service through which television and other video content is delivered to an end user over a packet-switched network, such as the internet. An IPTV subscriber receives a set-top box (STB) from the IPTV provider, which is also typically the internet service provider for the subscriber. The STB is able to access the IPTV service over the internet through other equipment at the customer premises, such as a modem, an Optical Network Termination (ONT), a residential gateway, etc. This equipment connects the STB to an access network that provides connectivity to the internet. For example, the access network may comprise a Digital Subscriber Line (xDSL) network, a Passive Optical Network (PON), a cable network, etc. When connected to the internet, IPTV servers provide video stream(s) to the STB for viewing over the subscriber's television or other suitable display. The IPTV subscriber can view an Electronic Programming Guide (EPG) displayed by the STB, and select programs or videos to watch.

IP multicast delivery is advantageous because it provides efficient bandwidth usage over the internet and/or over the access network. For example, a sender transmits packets of an IP multicast stream to a group address. Nodes in the network (e.g., switches, routers, etc.) replicate the packets of the IP multicast stream so that the packets reach each receiver in the group. Thus, the sender only has to send the packets of the IP multicast stream once, and the network infrastructure replicates the IP multicast stream for delivery to the receivers. Internet service providers may reserve bandwidth for IPTV services or other IP multicast delivery services so that a quality of delivery may be guaranteed. Despite the guaranteed quality of delivery for IP multicast delivery, nodes and/or links in the network may become defective which interrupts transmission of an IP multicast stream. Therefore, a subscriber may not be able to view the content. For IPTV service in particular, troubleshooting is a main contributor to the high operational cost of the IPTV service. Therefore, service providers continue to look for ways to quickly and easily detect a node or link at fault, and report the fault to a management system.

SUMMARY

Embodiments described herein provide for monitoring of IP multicast streams at an internet gateway device located at a customer premises. When a receiver joins a group address for an IP multicast stream, the internet gateway device is able to monitor for packets directed to the group address. If packets are not received for the group address, then the internet gateway device is able to report an alarm to a management system. The service provider can then troubleshoot the problem based on the alarm from the internet gateway device so that the IP multicast stream can be provided to the receiver.

One embodiment comprises an internet gateway device for installation at a customer premises. The internet gateway device includes a monitoring unit configured to identify a request to join an IP multicast stream identified by a group address, and to monitor for packets directed to the group address. The monitoring unit is configured to detect a stream loss responsive to a failure to receive a packet directed to the group address during a time interval, and to report the stream loss for the group address to a management system.

In another embodiment, the monitoring unit is configured to detect that the stream loss ended responsive to receiving packets directed to the group address, and to report that the stream loss ended to the management system.

In another embodiment, the internet gateway device is configured to communicate with the management system through Customer Premises Equipment (CPE) Wide Area Network (WAN) Management Protocol (CWMP). A new parameter is defined for CWMP indicating stream loss of IP multicast streams detected in internet gateway devices.

In another embodiment, a new internet gateway device object is defined for CWMP that includes the new parameter indicating stream loss of IP multicast streams detected in internet gateway devices, and the new internet gateway device object is defined for an Internet Group Management Protocol (IGMP) proxy.

In another embodiment, the new internet gateway device object includes a path name of "InternetGatewayDevice.IGMProxy".

In another embodiment, the internet gateway device is configured to report the stream loss to an Auto-Configuration Server (ACS) defined in CWMP.

In another embodiment, the internet gateway device is configured to connect to a set-top box of an IPTV provider. The monitoring unit is configured to identify a request from the set-top box to join an IPTV channel identified by the group address, and to monitor for packets directed to the group address for the IPTV channel.

In another embodiment, an Optical Network Termination (ONT) device connects to the internet gateway device. The ONT device is configured to communicate with an Optical Line Termination (OLT) device according to communication protocols defined by DOCSIS® Provisioning of EPON (DPoE) specifications. A new Packet Data Unit (PDU) is defined in the DPoE specifications indicating stream loss of IP multicast streams detected in ONT devices.

Another embodiment comprises a method for reporting loss of an IP multicast stream in an internet gateway device installed at a customer premises. The method includes identifying a request to join the IP multicast stream identified by a group address, and monitoring for packets directed to the group address. The method further includes detecting a stream loss responsive to a failure to receive a packet directed to the group address during a time interval, and reporting the stream loss for the group address to a management system.

Another embodiment comprises an internet gateway device configured to connect to a set-top box for an IPTV service. The internet gateway device includes a monitoring unit configured to identify request to join an IPTV channel identified by a group address, and to monitor for packets on the IPTV channel. The internet gateway device is configured to detect a stream loss responsive to a failure to receive a packet on the IPTV channel during a time interval, and to report the stream loss for the IPTV channel to a management system.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
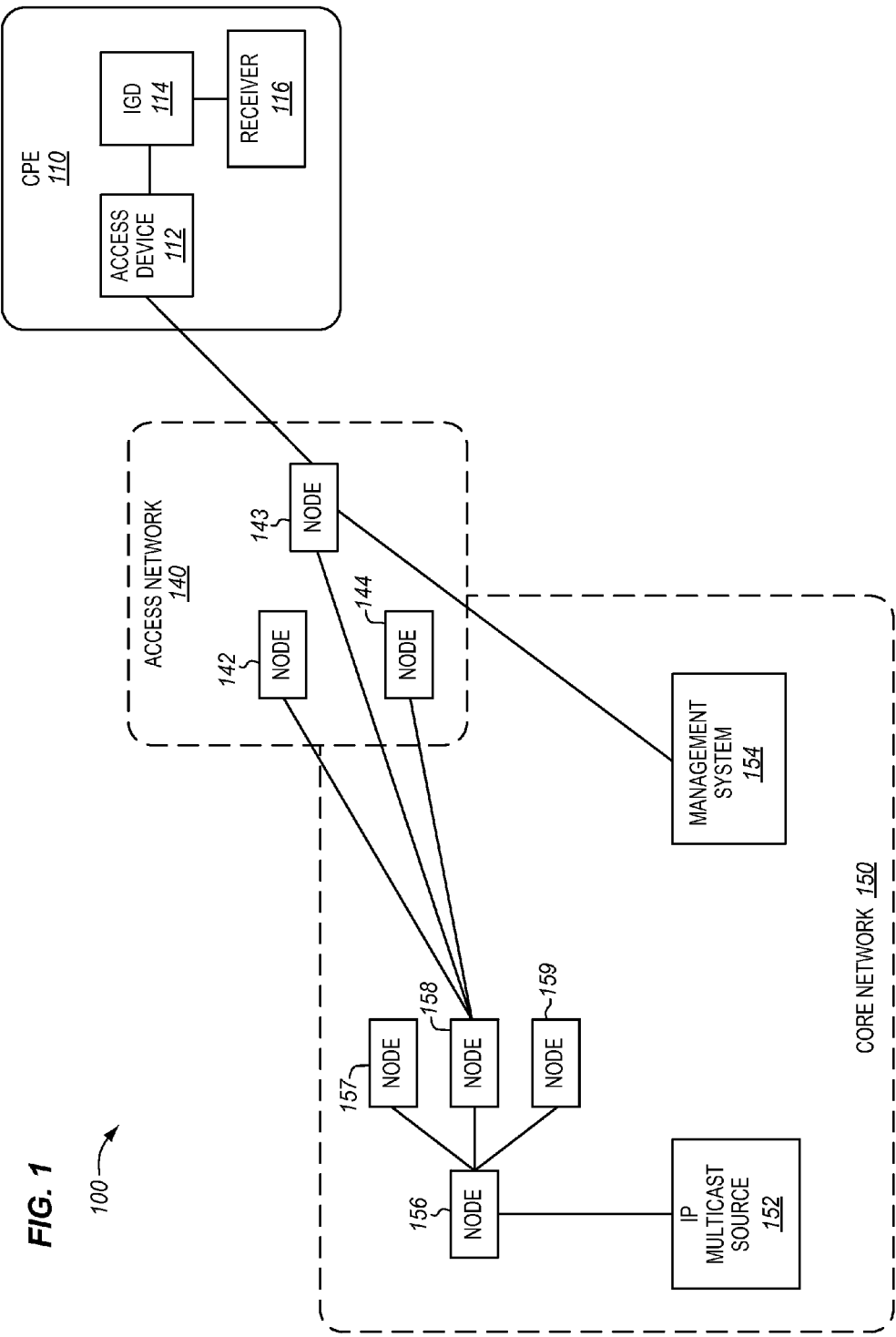
FIG. 1 illustrates a communication network for IP multicast delivery in an exemplary embodiment.

FIG. 1 illustrates a communication network 100 for IP multicast delivery in an exemplary embodiment. One assumption for FIG. 1 is that an end user subscribes to an IP multicast service. The end user has Customer Premises Equipment (CPE) 110, which represents the equipment, terminals, devices, etc., of a customer which are configured to connect to a provider's network. For example, CPE 110 includes an access device 112, an internet gateway device (IGD) 114, and a receiver 116. Access device 112 acts as a termination point in a customer premises for an access network. For example, access device 112 may comprise a cable modem that acts as a termination point for a cable network, an Optical Network Termination (ONT) that acts as a termination point for an optical network (e.g., a Passive Optical Network (PON)), a Digital Subscriber Line (DSL) modem that acts as a termination point for a DSL line, etc. Internet gateway device 114 comprises any device or equipment (including hardware) that connects one or more end user devices (e.g., computer, laptop, tablet, smart phone, etc.) in the customer premises to the Internet or other Wide Area Network (WAN). One example of internet gateway device 114 is a residential gateway, which manages the connection and sharing of an internet service among end user devices, such as a computer, laptop, tablet, smart phone, etc. Receiver 116 comprises a component or device that is configured to join an IP multicast group, and receive an IP multicast stream for the group. One example of receiver 116 is a set-top box for an IPTV service.

Communication network 100 includes an access network 140 that connects CPE 110 to a core network 150. Core network 150 comprises a packet-switched (PS) network that is able to transport IP multicast streams. The most common example of core network 150 is the Internet, but IP multicast streams may be transported over other types of PS networks. Access network 140 comprises any network that connects customers to core network 150. For example, access network 140 may comprise a cable network (coaxial or hybrid), an optical network such as a PON, a DSL network, etc.

Access network 140 includes a plurality of nodes 142-144 (also referred to as network elements) that are able to deliver IP multicast streams. For example, nodes 142-144 may represent routers or network switches in access network 140 that are able to replicate an IP multicast stream, and forward the IP multicast stream toward the receivers in the group.

Core network 150 includes an IP multicast source 152, a management system 154, and a plurality of nodes 156-159. IP multicast source 152 represents a node that sends an IP multicast stream destined for a group address. For example, IP multicast source 152 may comprise an IPTV head end or IPTV server that delivers IPTV content using IP multicast delivery. Although IP multicast source 152 is shown in core network 150, it may be external to core network 150. Management system 154 comprises a server or group of servers that manage IP multicast services or group services. One example of management system 154 is an Operations Support System (OSS). Management system 154 may monitor for faults regarding IP multicast services, monitor usage of the IP multicast services, etc. Nodes 156-159 (also referred to as network elements) are able to deliver IP multicast streams. For example, nodes 156-159 may represent routers or network switches in core network 150 that are able to replicate an IP multicast stream, and forward the IP multicast stream toward the receivers in the group.

The lines between the nodes in FIG. 1 may illustrate an IP multicast stream. IP multicast source 152 sends an IP multicast stream to node 156, which replicates the IP multicast stream and forwards it to nodes 157-159. Node 158 also replicates the IP multicast stream, and forwards it to nodes 142-144 in access network 140. Node 143 replicates the IP multicast stream, and forwards it to CPE 110 and other CPEs not shown in FIG. 1. Despite the guaranteed quality of delivery for IP multicast, sometimes nodes and/or links become defective which causes the IP multicast stream to stop. For example, when node 143 is defective and does not replicate and forward the IP multicast stream, CPE 110 will not receive the IP multicast stream. CPE 110 is enhanced in this embodiment to monitor one or more IP multicast streams, and report the status of the IP multicast streams to management system 154.

Figure 2:
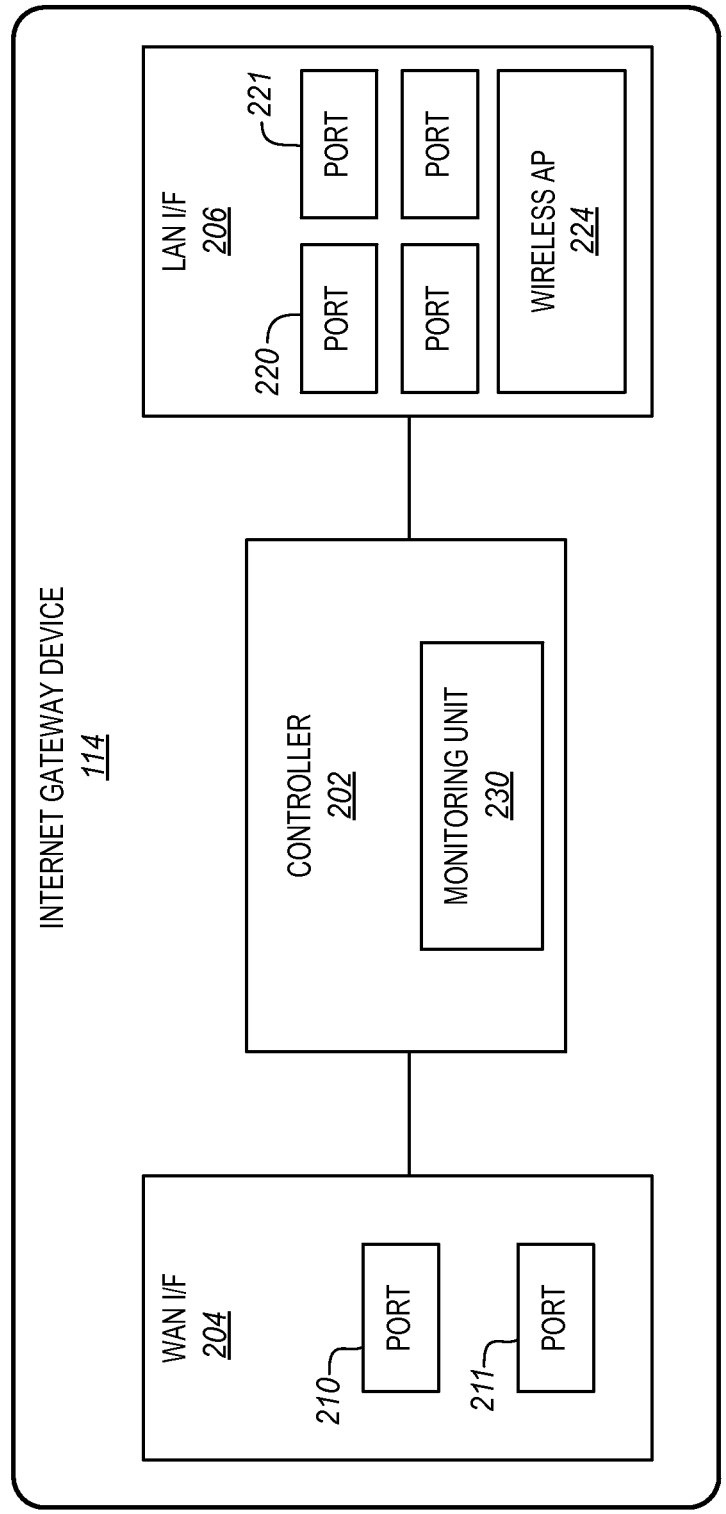
FIG. 2 is a schematic diagram of an internet gateway device in an exemplary embodiment.

FIG. 2 is a schematic diagram of internet gateway device 114 in an exemplary embodiment. Internet gateway device 114 includes a controller 202, a WAN interface 204, and a LAN interface 206. Controller 202 comprises a device or component that controls the overall operation of internet gateway device 114. WAN interface 204 comprises a device or component that connects internet gateway device 114 to a WAN, such as the internet. WAN interface 204 may include one or more ports 210-211 for connecting to the internet. For example, port 210 may represent an RJ-45 port for receiving a Category-5 (CAT-5) cable. The CAT-5 cable may connect WAN interface 204 to a cable modem, a DSL modem, an ONT, etc. Internet gateway device 114 may also have an integrated modem. Thus, port 210 may represent a coaxial cable connector, a telephone line connector, an optical cable connector, etc.

LAN interface 206 comprises a device or component that connects internet gateway device 114 to end user devices in the customer premises, such as a computer, laptop, smart phone, set-top box, etc. LAN interface 206 may include one or more ports 220-221 for connecting to the end user devices over wired connections, such as a CAT-5 cable. LAN interface 206 may also include a wireless access point 224, that is configured to communicate with end user devices over wireless signals. For example, wireless access point 224 may represent a WiFi access point that uses 802.11b or another WLAN protocol.

One or more of the elements of internet gateway device 114 operate on a computing processing unit, such as a single-core processor, multi-core processors, etc. The elements may alternatively operate on an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof.

Controller 202 is enhanced in this embodiment with a monitoring unit 230. Monitoring unit 230 comprises any device, component, or module (including hardware) that is configured to monitor IP multicast streams that have been requested by customer premises equipment. Monitoring unit 230 is also configured to report stream loss to a management entity so that a service provider can address any fault that caused the stream loss. A more detailed description of monitoring unit 230 is provided below.

Figure 3:
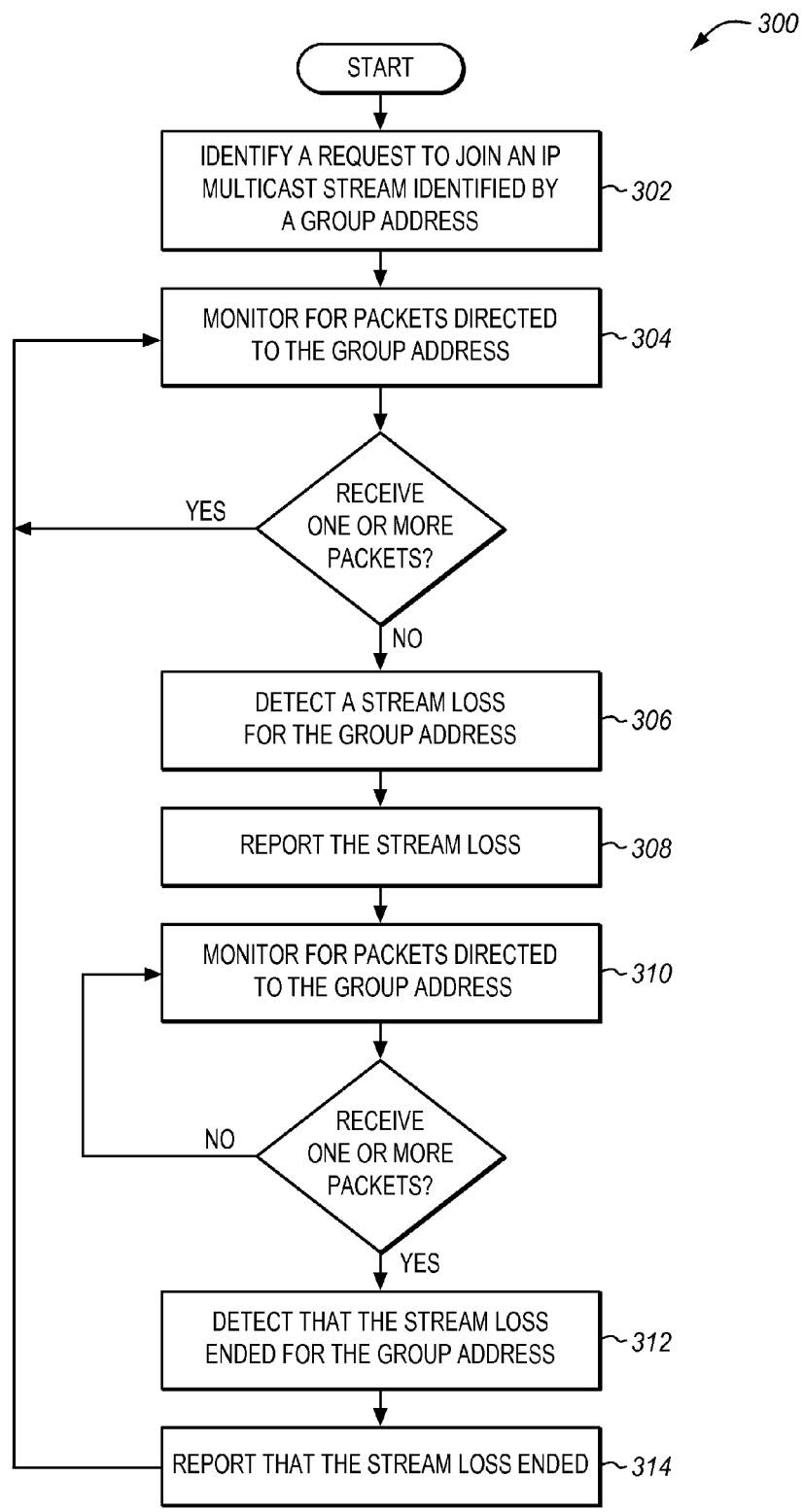
FIG. 3 is a flow chart illustrating a method for monitoring IP multicast streams in internet gateway device in an exemplary embodiment.

FIG. 3 is a flow chart illustrating a method 300 for monitoring IP multicast streams in internet gateway device 114 in an exemplary embodiment. The steps of method 300 will be described with reference to internet gateway device 114 in FIG. 2, but those skilled in the art will appreciate that method 300 may be performed in other systems. Also, the steps of the flow charts described herein are not all inclusive and may include other steps not shown, and the steps may be performed in an alternative order.

In this embodiment, it is assumed that receiver 116 has requested to join an IP multicast stream (see FIG. 1). For example, if receiver 116 comprises a set-top box for an IPTV service, then the set-top box may request to join a particular IPTV channel that is delivered using IP multicast. Monitoring unit 230 identifies the request to join the IP multicast stream identified by a group address (step 302). Monitoring unit 230 then monitors for packets directed to the group address (step 304). For example, if the group address is 239.3.3.6, then monitoring unit 230 monitors for packets addressed to this IP address. If monitoring unit 230 fails to receive one or more packets directed to the group address during a time interval, then monitoring unit 230 detects a stream loss for this group address (step 306). A stream loss refers to a failure to receive any packets directed to a group address during a time interval (e.g., 5 seconds, 10 seconds, 15 seconds, etc.). The time period may be configurable by the service provider to account for any latency in the network for delivering the IP multicast stream. Monitoring unit 230 then reports the stream loss for the group address to management system 154 (step 308). If monitoring unit 230 does receive packets directed to the group address during a time interval, then monitoring unit 230 continues to monitor for packets directed to the group address during a next time interval.

When management system 154 receives a report from monitoring unit 230 indicating a stream loss for the IP multicast stream, the service provider is able to troubleshoot the fault(s) based on the report from monitoring unit 230 and reports from other nodes upstream from monitoring unit 230. When the service provider fixes the fault, it is assumed that the IP multicast stream is sent to the group address. Monitoring unit 230 again monitors for packets directed to the group address (step 310). If monitoring unit 230 does receive packets directed to the group address during a time interval, then monitoring unit 230 detects that the stream loss ended for the group address (step 312). Monitoring unit 230 reports to management system 154 that the stream loss ended (step 314). Method 300 then returns to step 304 when monitoring system 230 continues to monitor for packets directed to the group address during a next time interval. The service provider can statically or dynamically configure different schemes (based on needs or requests) at internet gateway device 114 for stream loss monitoring.

Communication network 100 may use Customer Premises Equipment (CPE) Wide Area Network (WAN) Management Protocol (CWMP) to configure internet gateway device 114 (see FIG. 1). CWMP defines the mechanism that configures and manages customer premises equipment, and is described in TR-069 (Technical Report 069, Version 1.1) published by the Broadband Forum (formerly the DSL Forum). TR-098 (Technical Report 098) describes data models in CWMP for internet gateway devices. CWMP does not presently support a data model that allows internet gateway devices to report stream loss for an IP multicast stream to a management entity as described above. Therefore, to support this feature, an enhanced or customized data model is proposed herein for CWMP. TR-098 describes objects for internet gateway devices in CWMP. Exemplary objects are "InternetGatewayDevice.DeviceInfo" and "InternetGatewayDevice.DeviceConfig". Within each of these objects, TR-098 defines parameters for the objects. For example, the parameters for the "InternetGatewayDevice.DeviceInfo" object include "Manufacturer", "ModelName", and "SoftwareVersion". The proposal herein is to include a new or customized parameter for an internet gateway device object that indicates stream loss for an IP multicast stream directed to a group address. The new parameter for stream loss may be included in an existing internet gateway device object of CWMP. Alternatively, the new parameter for stream loss may be included in a new internet gateway device object.

Internet Group Management Protocol (IGMP) is a protocol used by IP hosts to report their multicast group memberships to any immediately-neighboring multicast routers (see RFC 2236 of the Internet Engineering Task Force (IETF)). For example, if receiver 116 in FIG. 1 wants to join an IP multicast stream, then it may send an IGMP join group request to an upstream router. An IGMP "proxy" is a multicast router that learns multicast group membership information, and forwards multicast packets based upon the group membership information. The new internet gateway device object may be defined for an IGMP proxy. An example of the proposed object is as follows:

InternetGatewayDevice.IGMPProxy.GroupInfo. {i} P
  GroupAddress: R, String.
  Stream Loss: R, Boolean
  internetGatewayDevice.IGMPProxy.GroupInfo.
    {i}.interfaceInfo. {i} P
    InterfaceReference: Read Only, String.
    Time: At which group is added. Date & time. Read Only, String type.
    IncludedSourceIPs: R, String. Comma separated IP addresses.
    ExcludedSourceIPs: R, String. Common separated IP addresses.

In this new object, the "Stream Loss" parameter is included so that an internet gateway device (e.g., internet gateway device 114) is able to report a stream loss to a management system. The stream loss parameter is of type "Boolean". A value of "1" may indicate stream loss, and a value of "0" may indicate no stream loss or that a stream loss has cleared.

When access network 140 is an optical network, then access device 112 comprises an Optical Network Termination (ONT) device or an Optical Network Unit (ONU) device (see FIG. 1). An ONT device acts as a termination point in a customer premises for an optical distribution network (ODN) (e.g., a Passive Optical Network (PON)). An ONT device may be integrated with an internet gateway device in one embodiment. An OLT device is a device that connects to ONT devices over an ODN, and terminates the common endpoint of an ODN. The Cable Data Services DOCSIS® Provisioning of EPON (DPoE) Specifications govern the communication protocols between the OLT and ONT.

The DPoE™ MAC and Upper Layer Protocols Interface Specification (MULPI) (e.g., DPoE-SP-MULPIv2.0405-140327) describes the MAC and upper layer protocols for DPoE networks. The DPoE™ OAM Extensions Specification (e.g., DPoE-SP-OAMv2.0-105-140327) describes the interface used for conveying management information between a DPoE System and an ONT device. This specification defines message format and contents for the following types of configuration or information collection:
  General management and device capabilities
  Forwarding provisioning
  Statistics collection
  Alarm status
  Security key exchange
  Frame processing and classification
  Quality of Service provisioning
  Time Synchronization (ToD, Frequency, and Phase)

One embodiment as described herein proposes support of IP multicast stream monitoring on an ONT device. To support this feature, the above two specifications documents may be extended in the following way:

1. For the DPoE™ MAC and Upper Layer Protocols Interface Specification, the proposal herein is extend the description of multicast forwarding so that an ONT can notify an OLT of stream loss. For example, section 8.2 may be extended to indicate that the ONT (or ONU) monitors the IP multicast streams actively joined by the downstream devices in customer premises or corporate networks connected to the ONT. When no downstream flow is present for a IP multicast stream/group, possibly because of source failure, but also possibly because of misconfigurations or dysfunctions somewhere upstream, the ONT activates and notifies the OLT of the "stream loss" alarm. After a join, the ONT should wait a reasonable time for upstream processing before declaring a group to be lost. The alarm may contain, but not limited to the following attributes:
  VLAN ID, 0 if not used. (2 bytes)
  Source IP address, 0.0.0.0 if not used. (4 bytes)
  Multicast destination IP address. (4 bytes)

2. For the DPoE™ OAM Extensions Specification, the proposal herein is to include a new or customized Packet Data Unit (PDU) for a "stream loss" notification. This notification PDU is defined so that an ONT can notify an OLT of a "stream loss" alarm status.

EXAMPLE

Figure 4:
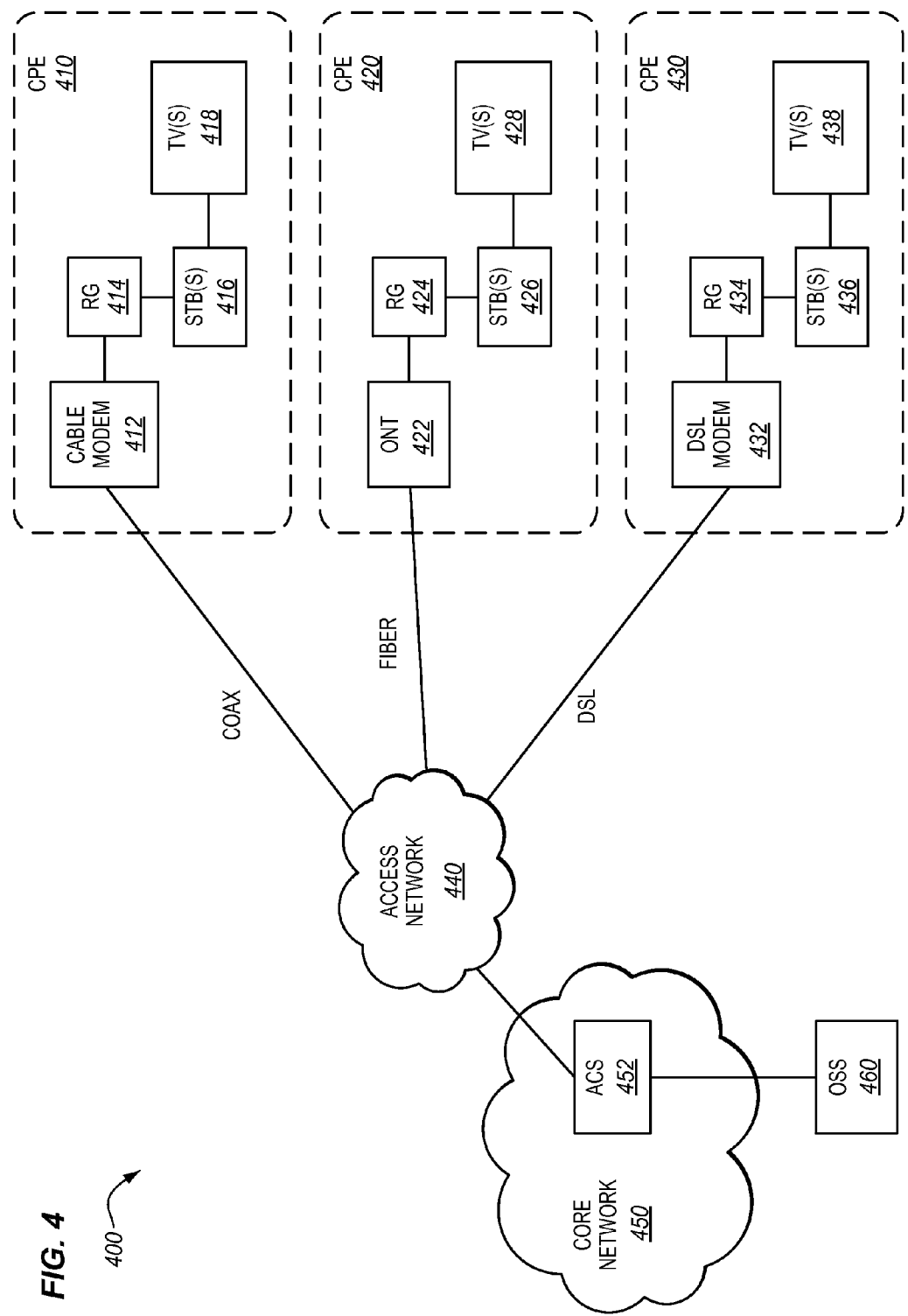
FIG. 4 illustrates an IPTV network for IPTV services in an exemplary embodiment.

The following example illustrates stream loss reporting by an internet gateway device for an IPTV service. FIG. 4 illustrates an IPTV network 400 for IPTV services in an exemplary embodiment. One assumption for FIG. 4 is that end users subscribe to IPTV services, and have IPTV accounts with an IPTV service provider that utilizes network 400. Each end user has customer premises equipment (CPE) that represents the equipment, terminals, devices, etc., which are configured to connect to a provider's network. For example, CPE 410 includes a cable modem 412, a residential gateway (RG) 414, one or more set-top boxes (STB) 416 for an IPTV service, and one or more televisions (TV) 418 or other suitable displays. Cable modem 412 is a device that acts as a termination point in a customer premises for a cable network. Cable modem 412 provides bi-directional data communication via radio frequency channels on a coaxial cable infrastructure for broadband internet access. Residential gateway 414 is a type of internet gateway device at the customer premises that connects one or more end user devices (e.g., computer, laptop, tablet, smart phone, etc.) to the Internet or other Wide Area Network (WAN). Residential gateway 414 manages the connection and sharing of the internet service among end user devices, such as a computer, laptop, tablet, smart phone, STB 416, etc. STB 416 comprises a component or device that receives signals or a flow of data that includes IPTV content (e.g., television, on-demand video, EPG, etc.) from an external source, and converts the signals or data flow into a format so that the IPTV content can be presented on TV 418. FIG. 4 shows one example of CPE 410, as other devices may be used as needed or desired.

CPE 420 includes an Optical Network Termination (ONT) 422, a residential gateway (RG) 424, one or more STBs 426 for an IPTV service, and one or more TVs 428 or other suitable displays. ONT 422 (which may also be referred to as an Optical Network Unit (ONU)) is a device that acts as a termination point in a customer premises for an optical network, such as a Passive Optical Network (PON). In other words, when the customer connection (i.e., "last mile") is an optical fiber, ONT 422 is the device that connects to the optical fiber for bi-directional communication. The other devices shown for CPE 420 are similar to CPE 410.

CPE 430 includes a DSL modem 432, a residential gateway (RG) 434, one or more STBs 436 for an IPTV service, and one or more TVs 438 or other suitable displays. DSL modem 432 is a device that acts as a termination point in a customer premises for a DSL line. DSL modem 432 is able to connect other devices to a telephone line which provides the DSL service for connectivity to the Internet for broadband internet access. The other devices shown for CPE 430 are similar to CPE 410.

Communication network 400 also includes an access network 440 that connects CPE 410, 420, and 430 to a core network 450. Core network 450 comprises a packet-switched (PS) network that is able to transport IPTV video streams. The most common example of core network 450 is the Internet, but IPTV services providers may use other PS networks for delivery. Access network 440 comprises any network that connects customers to core network 450. For example, access network 440 may comprise a cable network (coaxial or hybrid), an optical network such as a PON, a DSL network, etc.

Communication network 400 also includes an Operations Support System (OSS) 460. OSS 460 comprises a server or group of servers that manage IPTV services. For example, OSS 460 may monitor for faults regarding IPTV service, monitor usage of the IPTV service, etc. Although not shown in FIG. 4, network 400 may include other components for providing the IPTV services, such as IPTV servers that deliver IPTV content, IPTV backend systems, etc.

Communication network 400 uses CWMP to configure CPE 410, 420, and 430. CWMP uses an Auto-Configuration Server (ACS) that communicates with customer premises equipment to configure and manage the devices. Therefore, an ACS 452 is shown in core network 450 that is able to communicate with CPE 410, 420, and 430.

IPTV service is delivered in network 400 through IP multicast streams. As described above, an IP multicast stream is directed to a group address. For IPTV service, a channel corresponds with a group address for an IP multicast stream. For example, channel 6 for IPTV service may correspond with the group address "239.3.3.6". When a user of a set-top box tunes to a channel of the IPTV service, the set-top box will request to join the group address for that channel, such as with an IGMP message. Upstream nodes will then forward the IP multimedia stream to the requesting set-top box.

Figure 5:
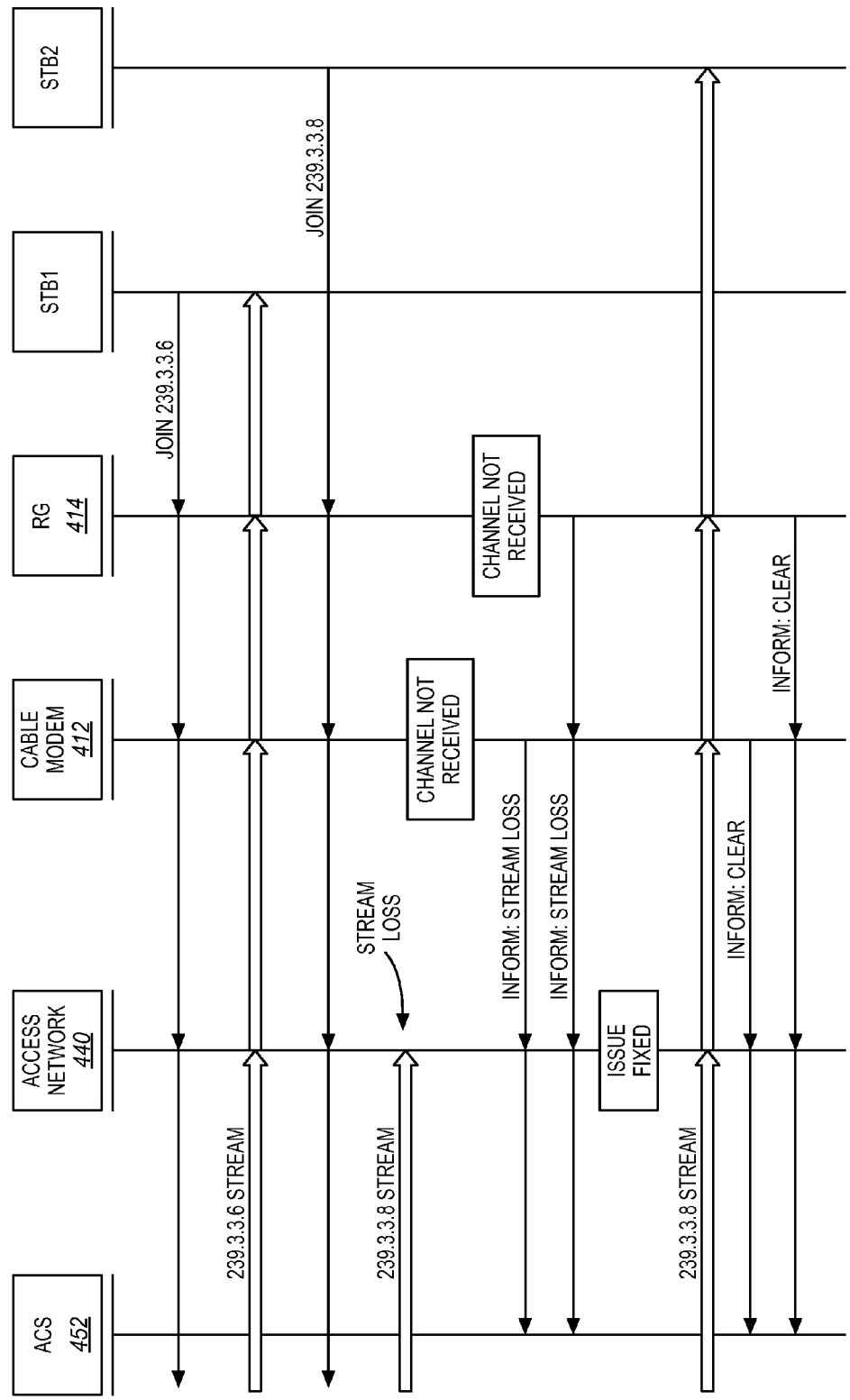
FIG. 5 is a message diagram illustrating a fault in an access network in an exemplary embodiment.

The following illustrates different scenarios of detecting stream loss of an IP multicast stream, and reporting the stream loss to ACS 452. It is assumed for this example that CPE 410 in FIG. 4 includes two STBs 416 (i.e., STB1 and STB2). FIG. 5 is a message diagram illustrating a fault in an access network in an exemplary embodiment. STB1 sends an IGMP Join message to access network 440 to join the group address 239.3.3.6, which is a channel of the IPTV service (e.g., channel 6). Access network 440 then forwards the IGMP Join message to core network 450 (not shown in FIG. 5) if this is the first join message for this group on access network 440 (i.e., no other customer on access network 440 has joined this group before). An upstream network element (e.g., an IPTV server) in core network 450 transmits an IP multicast stream directed to the group address "239.3.3.6". A network element within access network 440 then replicates and forwards the IP multicast stream to STB1 through cable modem 412 and RG 414. STB1 presents the IPTV channel on TV 418.

STB2 sends an IGMP Join message to access network 440 to join the group address 239.3.3.8, which is another channel of the IPTV service (e.g., channel 8). Access network 440 then forwards the IGMP Join message to core network 450 if this is the first join message for this group on access network 440. An upstream network element (e.g., an IPTV server) in core network 450 transmits an IP multicast stream to access network 440 directed to the group address "239.3.3.8". Due to a defect or fault in access network 440, the IP multicast stream for the group address 239.3.3.8 is not replicated or forwarded to CPE 410. Cable modem 412 and/or RG 414 monitor for packets directed to group address 239.3.3.8. If no packets are received during a time interval (e.g., 10 seconds), then stream loss is detected for the IP multicast stream. When this occurs, cable modem 412 and/or RG 414 report the stream loss to ACS 452 for the group address 239.3.3.8. To do so, cable modem 412 sends a CWMP inform message to ACS 452 that includes a parameter indicating stream loss for the group address. This report is an alarm to ACS 452 regarding the stream loss for group address 239.3.3.8. RG 414 may report the stream loss in a similar manner.

In response to the stream loss report(s), ACS 452 reports an alarm to OSS 460 for the group address 239.3.3.8. Operators of network 400 will then troubleshoot the issue based on the alarm reported by cable modem 412, RG 414, and other customer premises equipment, and fix the issue. After the problem(s) are fixed, the upstream elements will again send the IP multicast stream for group address 239.3.3.8 to access network 440. Access network 440 forwards the IP multicast stream to STB2 through cable modem 412 and RG 414. STB2 is then able to present this IPTV channel (channel 8) on TV 418.

When the IP multicast stream for group address 239.3.3.8 is successfully received in STB2, cable modem 412 and/or RG 414 clears the alarm in ACS 452 for group address 239.3.3.8. To do so, cable modem 412 may again send a CWMP inform message to ACS 452 that includes a parameter indicating that the stream loss has ended or is cleared for this group address. This message will clear the prior alarm in ACS 452 for group address 239.3.3.8. RG 414 may report that the stream loss has cleared in a similar manner.

Figure 6:
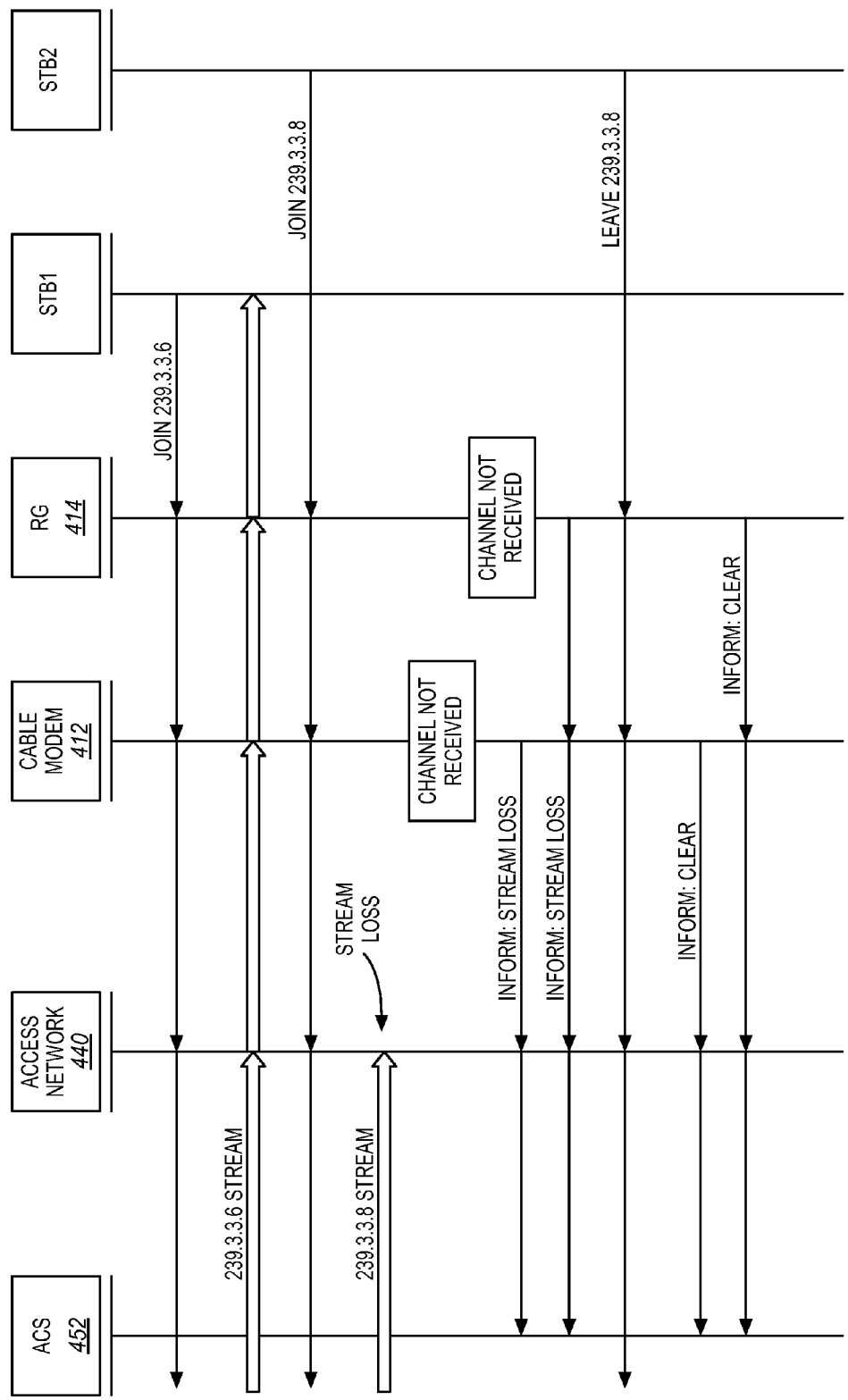
FIG. 6 is a message diagram illustrating another fault in the access network in an exemplary embodiment.

FIG. 6 is a message diagram illustrating another fault in an access network in an exemplary embodiment. STB1 sends an IGMP Join message to access network 440 to join the group address 239.3.3.6 (i.e., channel 6). Access network 440 then forwards the IGMP Join message to core network 450 (not shown in FIG. 6) if this is the first join message for this group address on access network 440. An upstream network element (e.g., an IPTV server) in core network 450 transmits an IP multicast stream directed to the group address "239.3.3.6". A network element within access network 440 then replicates and forwards the IP multicast stream to STB1 through cable modem 412 and RG 414. STB1 presents the IPTV channel on TV 418.

STB2 sends an IGMP Join message to access network 440 to join the group address 239.3.3.8, which is another channel of the IPTV service (e.g., channel 8). Access network 440 then forwards the IGMP Join message to core network 450 if this is the first join message for this group on access network 440. An upstream network element (e.g., an IPTV server) in core network 450 transmits an IP multicast stream to access network 440 directed to the group address "239.3.3.8". Due to a defect or fault in access network 440, the IP multicast stream for group address 239.3.3.8 is not replicated or forwarded to CPE 410. Cable modem 412 and/or RG 414 monitor for packets directed to group address 239.3.3.8. If no packets are received during a time interval (e.g., 10 seconds), then stream loss is detected for the IP multicast stream. When this occurs, cable modem 412 and/or RG 414 report the stream loss to ACS 452 for the group address 239.3.3.8. To do so, cable modem 412 sends a CWMP inform message to ACS 452 that includes a parameter indicating stream loss for the group address. This report is an alarm to ACS 452 regarding the stream loss for group address 239.3.3.8. RG 414 may report the stream loss in a similar manner.

If the end user decides to change the channel because there is no signal on channel 8, then STB2 sends an IGMP Leave message for the group address 239.3.3.8 to RG 414. RG 414 forwards the IGMP Leave message to access network 440, which in turn forwards the IGMP Leave message to core network 450 if this is the last leave message for this channel on access network 440 (i.e., no other customer on access network 440 are joined to this channel). Cable modem 412 and/or RG 414 clear the alarm in ACS 452 for group address 239.3.3.8. To do so, cable modem 412 may again send a CWMP inform message to ACS 452 that includes an indication that the stream loss has ended or is cleared. This message will clear the prior alarm in ACS 452 for group address 239.3.3.8. RG 414 may report that the stream loss has cleared in a similar manner. Operators may troubleshoot the problem even though the alarm is cleared and eventually fix the issue.

Figure 7:
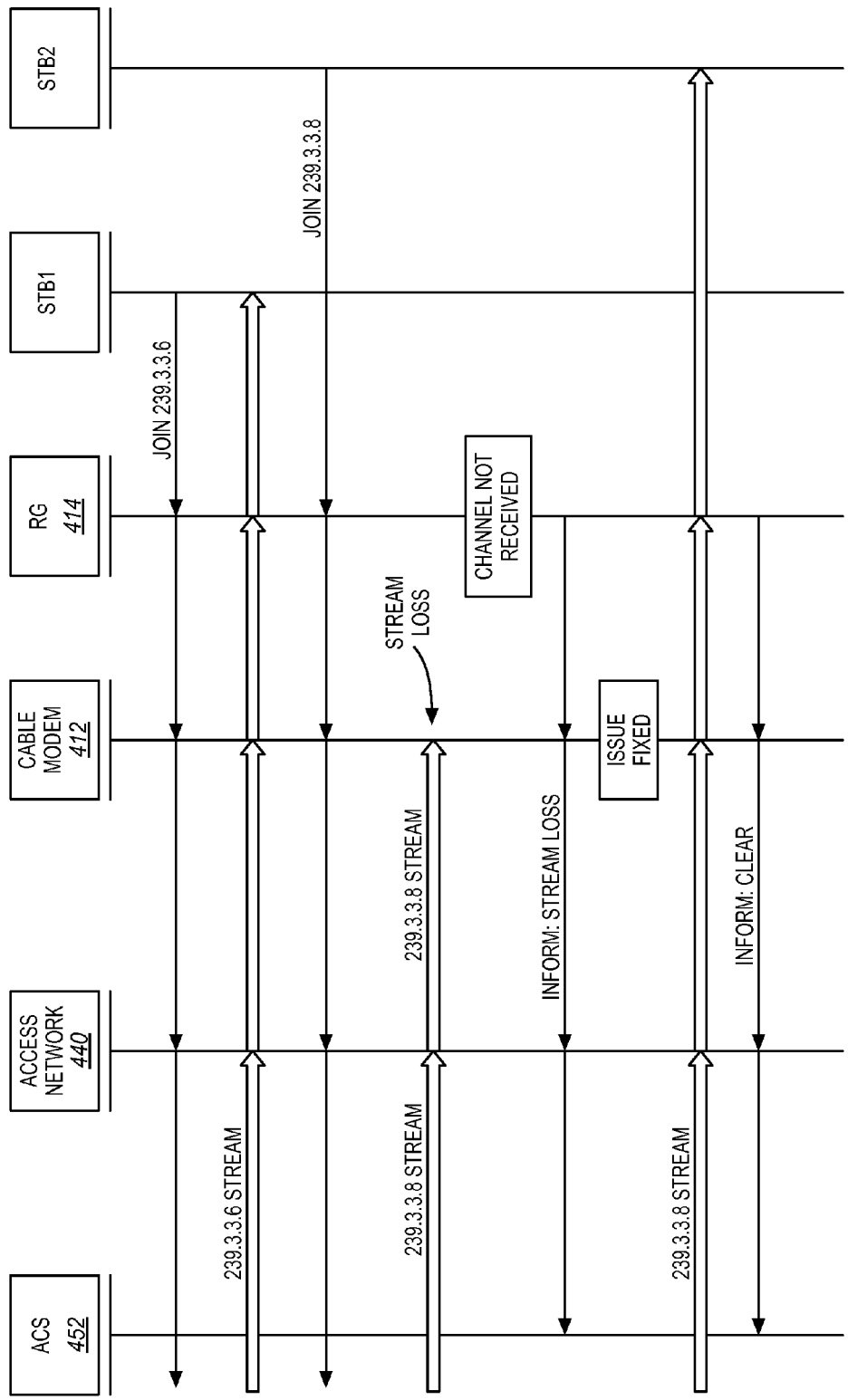
FIG. 7 is a message diagram illustrating a fault in a cable modem in an exemplary embodiment.

FIG. 7 is a message diagram illustrating a fault in cable modem 412 in an exemplary embodiment. STB1 sends an IGMP Join message to access network 440 to join the group address 239.3.3.6, which is a channel of the IPTV service (e.g., channel 6). Access network 440 then forwards the IGMP Join message to core network 450 (not shown in FIG. 5) if this is the first join message for this group on access network 440 (i.e., no other customer on access network 440 has joined this group before). An upstream network element (e.g., an IPTV server) in core network 450 transmits an IP multicast stream directed to the group address "239.3.3.6". A network element within access network 440 then replicates and forwards the IP multicast stream to STB1 through cable modem 412 and RG 414. STB1 presents the IPTV channel on TV 418.

STB2 sends an IGMP Join message to access network 440 to join the group address 239.3.3.8, which is another channel of the IPTV service (e.g., channel 8). Access network 440 then forwards the IGMP Join message to core network 450 if this is the first join message for this group on access network 440. An upstream network element (e.g., an IPTV server) in core network 450 transmits an IP multicast stream to access network 440 directed to the group address "239.3.3.8", and a node in access network 440 replicates and forwards the IP multicast stream to CPE 410. Due to a defect or fault in cable modem 412, the IP multicast stream for the group address 239.3.3.8 is not forwarded to RG 414. RG 414 monitors for packets directed to group address 239.3.3.8. If no packets are received during a time interval (e.g., 10 seconds), then RG 414 detects stream loss for the IP multicast stream, and reports the stream loss to ACS 452 for the group address 239.3.3.8. To do so, RG 414 sends a CWMP inform message to ACS 452 that includes a parameter indicating stream loss for the group address. This report is an alarm to ACS 452 regarding the stream loss for group address 239.3.3.8.

In response to the stream loss report(s), ACS 452 reports an alarm to OSS 460 for the group address 239.3.3.8. Operators of network 400 will then troubleshoot the issue based on the alarm reported by RG 414 and other customer premises equipment, and fix the issue. After the problem(s) are fixed, the upstream elements will again send the IP multicast stream for group address 239.3.3.8 to access network 440. Access network 440 forwards the IP multicast stream to STB2 through cable modem 412 and RG 414. STB2 is then able to present this IPTV channel (channel 8) on TV 418.

When the IP multicast stream for group address 239.3.3.8 is successfully received in STB2, RG 414 clears the alarm in ACS 452 for group address 239.3.3.8. To do so, RG 414 may again send a CWMP inform message to ACS 452 that includes a parameter indicating that the stream loss has ended or is cleared for this group address. This message will clear the prior alarm in ACS 452 for group address 239.3.3.8.

Figure 8:
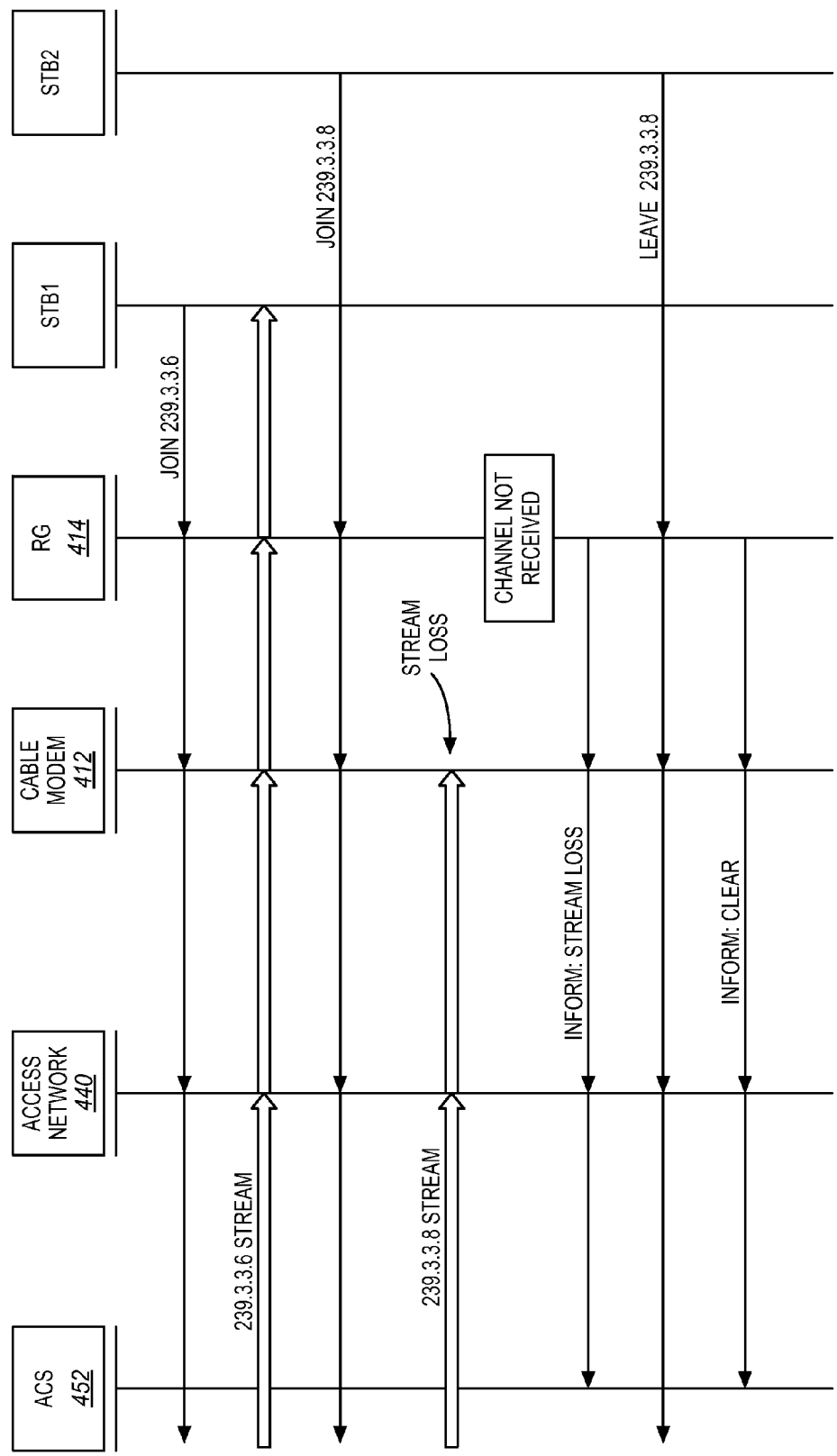
FIG. 8 is a message diagram illustrating another fault in the cable modem in an exemplary embodiment.

FIG. 8 is a message diagram illustrating another fault in cable modem 412 in an exemplary embodiment. STB1 sends an IGMP Join message to access network 440 to join the group address 239.3.3.6, which is a channel of the IPTV service (e.g., channel 6). Access network 440 then forwards the IGMP Join message to core network 450 (not shown in FIG. 5) if this is the first join message for this group on access network 440 (i.e., no other customer on access network 440 has joined this group before). An upstream network element (e.g., an IPTV server) in core network 450 transmits an IP multicast stream directed to the group address "239.3.3.6". A network element within access network 440 then replicates and forwards the IP multicast stream to STB1 through cable modem 412 and RG 414. STB1 presents the IPTV channel on TV 418.

STB2 sends an IGMP Join message to access network 440 to join the group address 239.3.3.8, which is another channel of the IPTV service (e.g., channel 8). Access network 440 then forwards the IGMP Join message to core network 450 if this is the first join message for this group on access network 440. An upstream network element (e.g., an IPTV server) in core network 450 transmits an IP multicast stream to access network 440 directed to the group address "239.3.3.8", and a node in access network 440 replicates and forwards the IP multicast stream to CPE 410. Due to a defect or fault in cable modem 412, the IP multicast stream for the group address 239.3.3.8 is not forwarded to RG 414. RG 414 monitors for packets directed to group address 239.3.3.8. If no packets are received during a time interval (e.g., 10 seconds), then RG 414 detects stream loss for the IP multicast stream, and reports the stream loss to ACS 452 for the group address 239.3.3.8. To do so, RG 414 sends a CWMP inform message to ACS 452 that includes a parameter indicating stream loss for the group address. This report is an alarm to ACS 452 regarding the stream loss for group address 239.3.3.8.

If the end user decides to change the channel because there is no signal on channel 8, STB2 sends IGMP Leave message for the group address 239.3.3.8 to RG 414. RG 414 forwards the IGMP Leave message to access network 440, which in turn forwards the IGMP Leave message to core network 450 if this is the last leave message for this channel on access network 440 (i.e., no other customer on access network 440 are joined to this channel). RG 414 clears the alarm in ACS 452 for group address 239.3.3.8. To do so, RG 414 may again send a CWMP inform message to ACS 452 that includes an indication that the stream loss has ended or is cleared. This message will clear the prior alarm in ACS 452 for group address 239.3.3.8. Operators may troubleshoot the problem even though the alarm is cleared and eventually fix the issue.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
   an internet gateway device of Customer Premises Equipment (CPE);
   the internet gateway device connects a receiver of the CPE to an access device of the CPE, wherein the receiver is configured to join an Internet Protocol (IP) multicast group, and the access device acts as a termination point in a customer premises for an access network;
   the internet gateway device is configured to communicate with an Auto-Configuration Server (ACS) through Customer Premises Equipment (CPE) Wide Area Network (WAN) Management Protocol (CWMP), wherein an enhanced data model is defined for the internet gateway device within CWMP to include a parameter indicating stream loss for IP multicast streams;
   the internet gateway device comprising:
      a monitoring unit configured to identify a request by the receiver to join an IP multicast stream identified by a group address for the IP multicast group, to monitor for packets directed to the group address, to detect a stream loss responsive to a failure to receive a packet directed to the group address during a time interval, and to report the stream loss for the group address by transmitting a first CWMP inform message to the ACS that includes the parameter indicating the stream loss.

2. The apparatus of claim 1 wherein:
   the monitoring unit is configured to detect that the stream loss ended responsive to receiving packets directed to the group address, and to report that the stream loss ended for the group address by transmitting a second CWMP inform message to the ACS that includes the parameter further indicating no stream loss.

3. The apparatus of claim 1 wherein:
   the enhanced data model includes a definition for an internet gateway device object;
   the internet gateway device object is defined for an Internet Group Management Protocol (IGMP) proxy; and
   the internet gateway device object includes the parameter indicating the stream loss.

4. The apparatus of claim 3 wherein:
   the internet gateway device object includes a path name of "InternetGatewayDevice.IGMPProxy".

5. The apparatus of claim 4 wherein:
   the internet gateway device object includes the parameter of type Boolean;
   a value of one for the parameter indicates stream loss; and
   a value of zero for the parameter indicates no stream loss.

6. The apparatus of claim 1 wherein:
   the receiver comprises a set-top box of an IP Television (IPTV) provider; and
   the monitoring unit is configured to identify a request from the set-top box to join an IPTV channel identified by the group address, and to monitor for packets directed to the group address for the IPTV channel.

7. The apparatus of claim 1 wherein:
   the access device comprises an Optical Network Termination (ONT) device;
   the ONT device is configured to communicate with an Optical Line Termination (OLT) device according to communication protocols defined by DOCSIS® Provisioning of EPON (DPoE) specifications;
   wherein a Packet Data Unit (PDU) is defined in the DPoE specifications indicating stream loss of IP multicast streams detected in ONT devices.

8. A method for reporting loss of an Internet Protocol (IP) multicast stream in an internet gateway device installed at a customer premises to connect a receiver at the customer premises to an access device at the customer premises, wherein the receiver is configured to join an IP multicast group, and the access device acts as a termination point in the customer premises for an access network, the method comprising:
   identifying, at the internet gateway device, a request by the receiver to join the IP multicast stream identified by a group address for the IP multicast group, wherein the internet gateway device is configured to communicate with an Auto-Configuration Server (ACS) through Customer Premises Equipment (CPE) Wide Area Network (WAN) Management Protocol (CWMP), and an enhanced data model is defined for the internet gateway device within CWMP to include the parameter indicating stream loss for IP multicast streams;
   monitoring for packets directed to the group address at the internet gateway device;
   detecting, at the internet gateway device, a stream loss responsive to a failure to receive a packet directed to the group address during a time interval; and
   reporting, at the internet gateway device, the stream loss for the group address by transmitting a first CWMP inform message to the ACS that includes the parameter indicating the stream loss.

9. The method of claim 8 further comprising:
   detecting, at the internet gateway device, that the stream loss ended responsive to receiving packets directed to the group address; and
   reporting that the stream loss ended for the group address by transmitting a second CWMP inform message to the ACS that includes the parameter further indicating no stream loss.

10. The method of claim 8 wherein:
    the enhanced data model includes a definition for an internet gateway device object;

the internet gateway device object is defined for an Internet Group Management Protocol (IGMP) proxy; and the internet gateway device object includes the parameter indicating the stream loss.

11. The method of claim 10 wherein:

the internet gateway device object includes a path name of "InternetGatewayDevice.IGMPProxy".

12. The method of claim 11 wherein:

the internet gateway device object includes the parameter of type Boolean;

a value of one for the parameter indicates stream loss; and a value of zero for the parameter indicates no stream loss.

13. The method of claim 8 wherein the receiver comprises a set-top box of an IP Television (IPTV) provider, and further comprising:

identifying a request from the set-top box to join an IPTV channel identified by the group address; and monitoring for packets directed to the group address for the IPTV channel.

14. An apparatus comprising:

an internet gateway device of Customer Premises Equipment (CPE) configured to connect to a set-top box for an Internet Protocol Television (IPTV) service, and to connect to an access device that acts as a termination point in a customer premises for an access network;

the internet gateway device is configured to communicate with an Auto-Configuration Server (ACS) through Customer Premises Equipment (CPE) Wide Area Network (WAN) Management Protocol (CWMP), wherein an enhanced data model is defined for the internet gateway device within CWMP to include the parameter indicating stream loss for IP multicast streams;

the internet gateway device comprising:

a monitoring unit configured to identify a request to join an IPTV channel identified by a group address, to monitor for packets on the IPTV channel, to detect a stream loss responsive to a failure to receive a packet on the IPTV channel during a time interval, and to report the stream loss for the IPTV channel by transmitting a first CWMP inform message to the ACS that includes the parameter indicating the stream loss.

15. The apparatus of claim 14 wherein:

the internet gateway device is configured to detect that the stream loss ended responsive to receiving packets on the IPTV channel, and to report that the stream loss ended for the IPTV channel by transmitting a second CWMP inform message to the ACS that further includes the parameter indicating no stream loss.

16. The apparatus of claim 14 wherein:

the enhanced data model includes a definition for an internet gateway device object;

the internet gateway device object is defined for an Internet Group Management Protocol (IGMP) proxy; and the internet gateway device object includes the parameter indicating the stream loss.

17. The apparatus of claim 16 wherein:

the internet gateway device object includes a path name of "InternetGatewayDevice.IGMPProxy".

18. The apparatus of claim 17 wherein:

the internet gateway device object includes the parameter of type Boolean;

a value of one for the parameter indicates stream loss; and a value of zero for the parameter indicates no stream loss.

* * * * *